(12) United States Patent
Piazza et al.

(10) Patent No.: US 9,634,775 B2
(45) Date of Patent: Apr. 25, 2017

(54) METHOD FOR CONFIGURING A RECONFIGURABLE ANTENNA SYSTEM

(71) Applicant: Adant Technologies, Inc., Santa Clara, CA (US)

(72) Inventors: Daniele Piazza, Padua (IT); John Kountouriotis, Philadelphia, PA (US)

( * ) Notice: Subject to any disclaimer, the term of this patent is extended or adjusted under 35 U.S.C. 154(b) by 107 days.

(21) Appl. No.: 14/430,281

(22) PCT Filed: Sep. 18, 2013

(86) PCT No.: PCT/IB2013/002031
§ 371 (c)(1),
(2) Date: Mar. 23, 2015

(87) PCT Pub. No.: WO2014/045096
PCT Pub. Date: Mar. 27, 2014

(65) Prior Publication Data
US 2015/0215054 A1    Jul. 30, 2015

Related U.S. Application Data

(60) Provisional application No. 61/704,777, filed on Sep. 24, 2012.

(51) Int. Cl.
*H04B 17/00* (2015.01)
*H04B 17/10* (2015.01)
(Continued)

(52) U.S. Cl.
CPC ............ *H04B 17/102* (2015.01); *H04B 7/06* (2013.01); *H04B 7/0691* (2013.01);
(Continued)

(58) Field of Classification Search
None
See application file for complete search history.

(56) References Cited

U.S. PATENT DOCUMENTS 6,141,335 A     10/2000  Kuwahara et al.
7,120,431 B1 *  10/2006  Huo .................... H01Q 1/246
                                                455/423

(Continued)

OTHER PUBLICATIONS

European Patent Office: International Search Report for International Application No. PCT/IB2013/002031. dated Jan. 22, 2014.

*Primary Examiner* — Lana N Le
(74) *Attorney, Agent, or Firm* — Patterson Intellectual Property Law, PC; Mark J. Patterson; Gary L. Montle

(57) ABSTRACT

The invention relates to a method (1) for configuring a reconfigurable antenna system (100). The method (1) comprises the following steps: a) selecting one or more groups of antenna configurations in a reference set of antenna configurations; and b) selecting one or more antenna configurations to be tested for each group of antenna configurations, which has been selected at the previous step a); and c) evaluating the radiating performance of said reconfigurable antenna system (100) for each antenna configuration, which has been selected at the previous step b), the radiating performance of said reconfigurable antenna system being evaluated on the base of estimation values that are calculated during one or more testing sessions of said reconfigurable antenna system; and d) selecting the optimal antenna configuration, for which said reconfigurable antenna system (100) has provided the best radiating performance during said testing sessions; and e) if the group of antenna configurations, to which said optimal antenna configuration belongs, comprises only said optimal antenna configuration, configuring said antenna elements (101) according to said optimal antenna configuration; or f) if the group of antenna configurations, to which said optimal antenna configuration belongs, comprises a plurality of antenna configurations, selecting said group of antenna configuration as new reference set of antenna configurations; and g) repeating the (Continued)

previous steps (a)-(d) for said new reference set of antenna configurations.

15 Claims, 6 Drawing Sheets

(51) Int. Cl.
*H04B 7/06* (2006.01)
*H04B 7/08* (2006.01)
*H04B 17/15* (2015.01)

(52) U.S. Cl.
CPC .......... *H04B 7/0695* (2013.01); *H04B 7/088* (2013.01); *H04B 7/0874* (2013.01); *H04B 17/15* (2015.01)

(56) References Cited

U.S. PATENT DOCUMENTS

| | | | | |
|---|---|---|---|---|
| 2002/0082016 A1* | 6/2002 | Obayashi | ............... | H04B 7/022 455/436 |
| 2005/0075139 A1* | 4/2005 | Shapira | ................. | H01Q 1/246 455/562.1 |
| 2005/0085223 A1* | 4/2005 | Liu | ........................ | H04B 17/20 455/423 |
| 2005/0101315 A1* | 5/2005 | Yamaguchi | .......... | H04B 7/0617 455/423 |
| 2005/0206564 A1* | 9/2005 | Mao | .................... | H01Q 3/2682 342/377 |
| 2016/0006121 A1* | 1/2016 | El-Sallabi | ................ | H01Q 3/24 342/443 |
| 2016/0182096 A1* | 6/2016 | Panioukov | ............... | H01Q 1/50 343/861 |

* cited by examiner

METHOD FOR CONFIGURING A RECONFIGURABLE ANTENNA SYSTEM

The present invention relates to the technical field of the reconfigurable antenna systems.

Reconfigurable antenna systems have received strong attention in the last years thanks to their capability of dynamically changing their radiating characteristics in response to the behavior of the wireless channel.

Reconfigurable antenna systems offer some advantages with respect to other available adaptive antenna systems.

Typically, they have a smaller size and allow achieving higher radiation efficiency.

In addition, recent studies have shown that they are capable of strongly improving the spectral efficiency of wireless communication devices.

Many examples of reconfigurable antenna systems have been proposed for Single Input Single Output (SISO), Single Input Multiple Output (SIMO), Multiple Input Single Output (MISO) or Multiple Input Multiple Output (MIMO) communication systems.

One of the main challenges that have to be faced when practically using a reconfigurable antenna system in a wireless communication apparatus (e.g. a Wi-Fi, LTE, WiMax wireless apparatus) is how to efficiently select the antenna configuration that is optimal for a given wireless channel.

Traditionally, in order to optimally carry out such a selection, it is necessary to estimate the channel response between the transmitter and the receiver for each antenna configuration of the communication link.

However, the estimation process of the channel response for each available antenna configuration is typically quite time and power consuming with consequent remarkable detrimental effects on the performance of the reconfigurable antenna system.

Such negative effects increase proportionally with the number of available antenna configurations for the antenna system. Thus, it may occur that the time wasted with searching for the optimal antenna configuration causes degradation in performance that may be higher than the capacity gain offered by the reconfigurable antenna system.

In the state of the art, some configuration techniques have been developed for efficiently selecting an optimal antenna configuration in a reconfigurable antenna system.

Unfortunately, most of these configuration techniques are based on the estimation of parameters that are not typically available on standard wireless chipsets or require a relatively long processing time for being calculated.

Therefore, it is still felt the demand for technical solutions capable of solving, at least partially, the drawbacks mentioned above.

In order to respond to this need, the present invention provides a method for configuring a reconfigurable antenna system, according to the following claim 1 and the related dependent claims.

In a further aspect, the present invention relates to an antenna system that is capable of implementing such a method for configuring a reconfigurable antenna system.

Advantageously, the antenna system, according to the invention, comprises a control unit (preferably a digital processing device, such as a microcontroller, a FPGA or a CPLD) for controlling the operation of the components of the antenna system.

Said control unit is capable of generating control signals for controlling electronic means capable of configuring the antenna elements of the antenna system according to a given antenna configuration.

Advantageously, said control unit is capable of executing computerised means (e.g. software modules, software procedures and/or software instructions) for implementing the method, according to the invention.

Preferably, said computerised means are stored in a memory comprised in said control unit. Further characteristics and advantages of the present invention shall emerge more clearly from the description of preferred but not exclusive embodiments that are illustrated purely by way of example and without limitation in the attached drawings 1-6.

With reference to the mentioned figures, the present invention relates to a method 1 for configuring a reconfigurable antenna system 100.

The reconfigurable antenna system 100 may be a transmitting and/or a receiving antenna system, depending on its employment in a communication system.

As an example, SIMO and MISO communication systems employ reconfigurable antenna systems only at the receiver or at the transmitter, respectively, whereas MIMO communication systems employ reconfigurable antenna systems at the both sides of the communication link.

The reconfigurable antenna system 100 can be used in various wireless communication systems including, but not limited to, systems employing beam forming, spatial multiplexing, space time diversity transmission schemes, wireless local area networks, wireless personal area networks, wireless ad hoc networks, sensor networks, wireless body area networks, radar systems, satellite communications networks, 3G cellular networks, and/or 4G cellular networks or the like.

Figure 2:
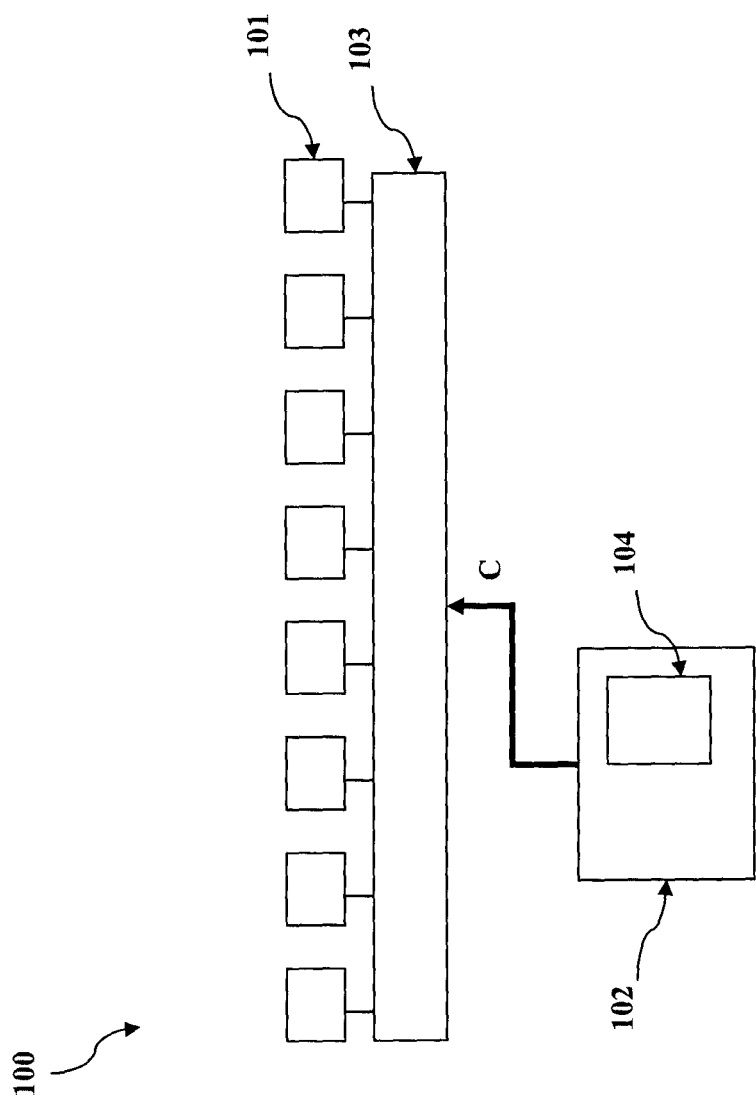
FIG. 2 is a block diagram representing an embodiment of the reconfigurable antenna system as disclosed herein.

Referring to FIG. 2, the reconfigurable antenna system 100 comprises a plurality of antenna elements 101, which can be arranged according to the needs.

Figure 5:
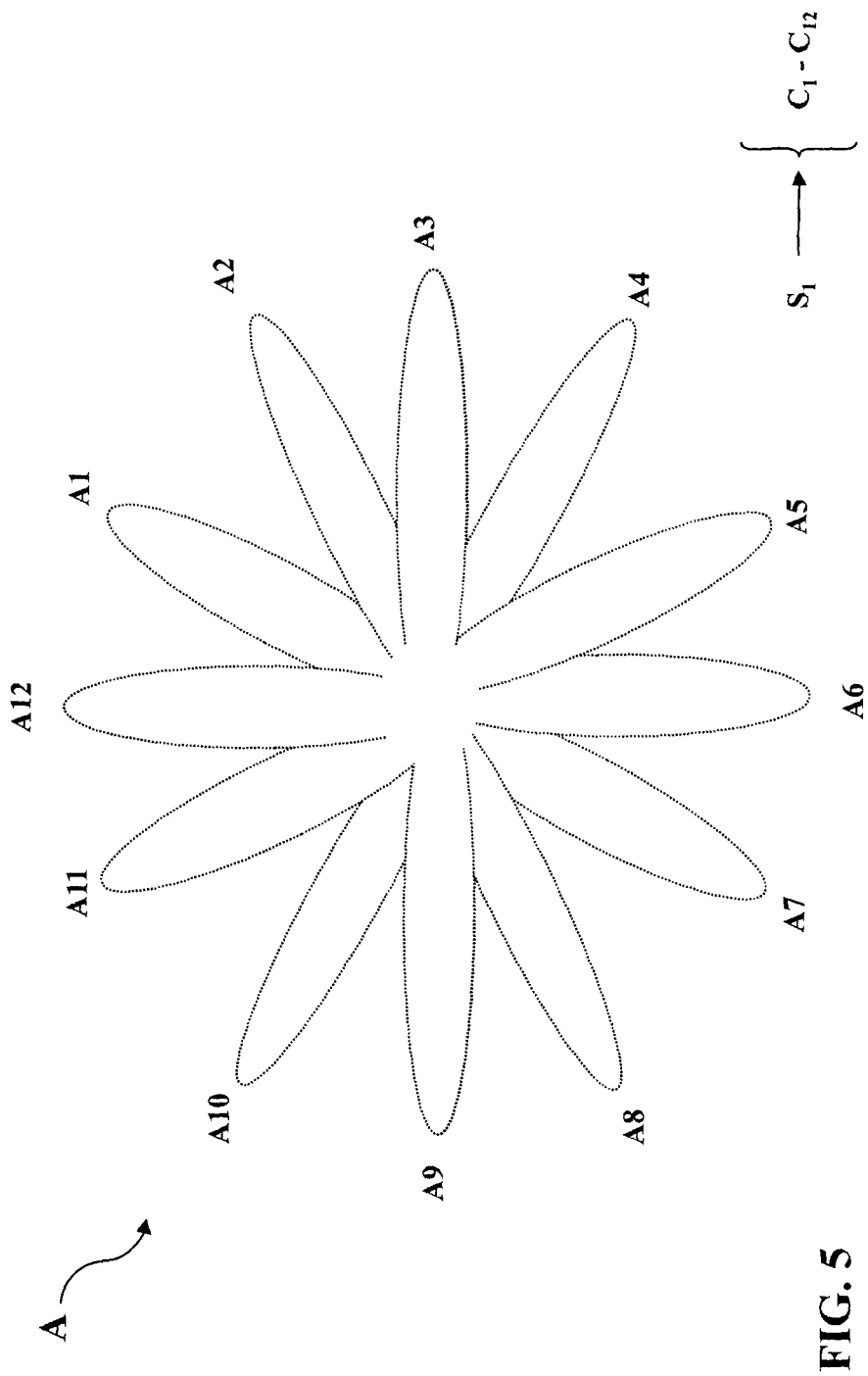
FIG. 5 is a diagram representing an exemplary implementation of the method of FIG. 1.

For example, as shown in FIG. 2, the reconfigurable antenna system 100 may consists of an array of antenna elements 101, which, as a whole, is capable of radiating a directive beam according to a set of different directions, e.g. according to a set A of twelve different directions $A_1$-$A_{12}$ over the full 360° angle (FIG. 5).

Each antenna element 101 may be provided with a single feeding point or with multiple feeding points (not shown).

In the first case, the antenna elements 101 have a single radiation pattern whereas, in the second case, the feeding points can be arranged so that the antenna elements 101 can simultaneously produce multiple radiation patterns.

The overlapping of the radiation patterns generated by the antenna elements 101 forms the radiation pattern generated by the antenna system 100, as a whole.

The antenna elements 101 can be configured according to a plurality of different antenna configurations.

For each antenna configuration, the antenna system 100 is capable of transmitting and/or receiving electromagnetic radiation with given radiation characteristics, such as a given radiation pattern, a given polarization or both.

Preferably, each antenna configuration of the antenna system 100 corresponds to a different radiation direction for this latter.

By changing the configuration of the antenna elements 101, the antenna system 100 is capable of effectively adapting its radiation properties to the conditions of a given wireless channel, thereby improving the communication there through.

The antenna system 100 comprises electronic means 103 for configuring the antenna elements 101, according to a given antenna configuration.

The electronic means 103 comprise, for example, diodes, switches, transistors, variable inductors and/or variable capacitors that are arranged so as to be capable of changing the current distribution in the antenna elements 101, which thereby can show specific radiation characteristics, e.g. a particular radiation pattern.

The antenna system 100 comprises a control unit 102 for controlling the operation of the components of the antenna system.

The control unit 102 is capable of generating control signals C for controlling the electronic means 103 in order to configure the antenna elements 101.

The control unit 102 is preferably a digital processing device, such as a microcontroller, a FPGA or a CPLD.

The control unit 102 comprises computerised means 104 (preferably stored in a memory), which may be software modules, software procedures and/or software instructions that can be executed by the control unit 102, e.g. for implementing the method 1.

Figure 3:
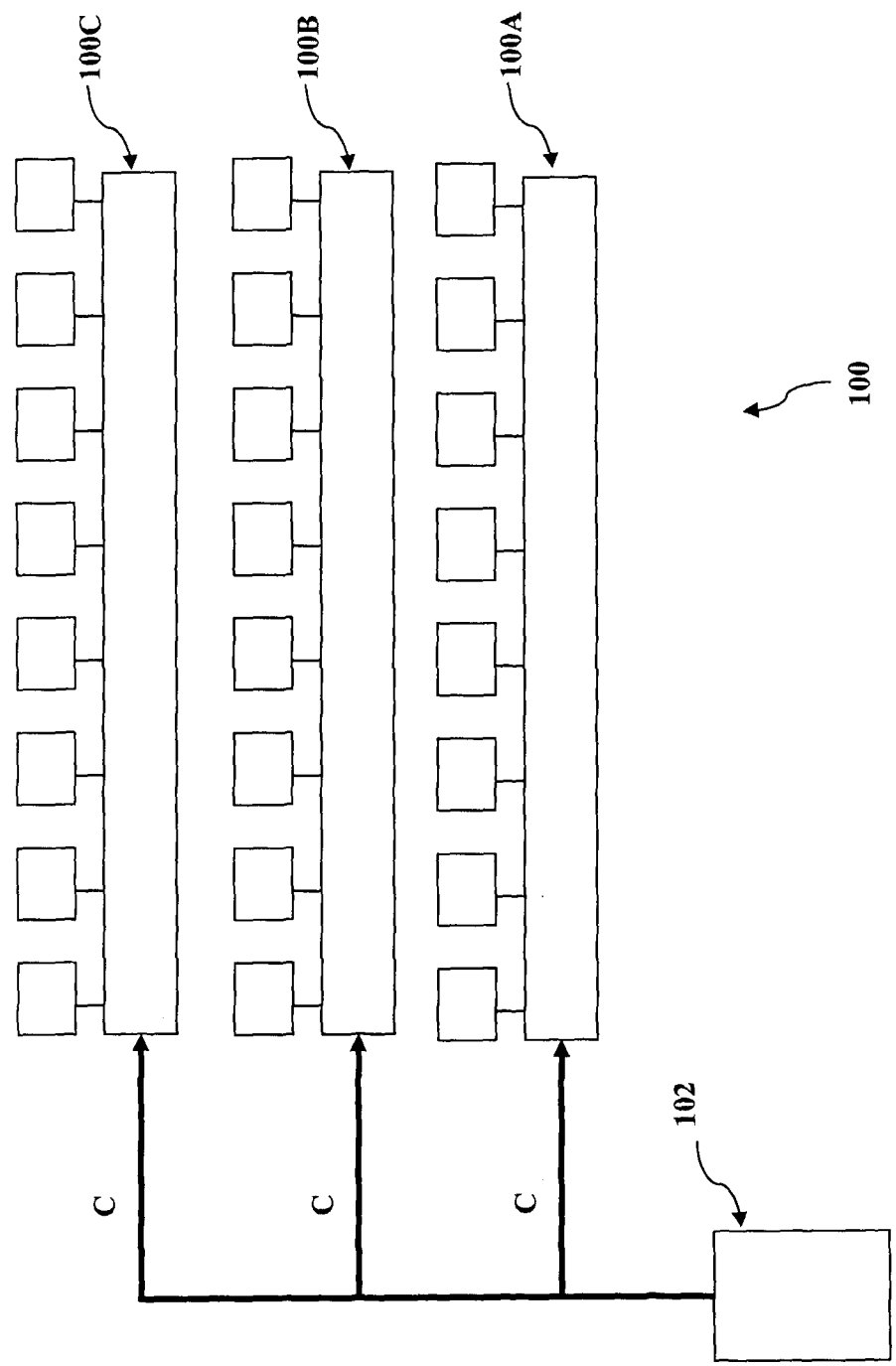
FIG. 3 is a block diagram representing another exemplary embodiment of the reconfigurable antenna system as disclosed herein.

As shown in FIG. 3, some embodiments of the antenna system 100 may provide for a plurality of arrays 100A, 100B, 100C of antenna elements 101.

According to a possible embodiment, the control unit 102 may be advantageously configured to configure each array 100A, 100B, 100C independently from the others, so that each array is capable of working as an independent reconfigurable antenna system.

According to an alternative embodiment, the control unit 102 may be advantageously configured to control the set of arrays 100A, 100B, 100C as a whole. In this case, the arrays 100A, 100B, 100C form a matrix of antenna elements 101 that are operated in a correlated manner.

As mentioned above, the antenna system 100 may be a transmitting or a receiving antenna system.

According to another embodiment of the present invention (FIG. 4), the antenna system 100 may comprise a transmitting antenna system 100E and a receiving antenna system 100F that are capable of mutually communicating.

Each of the transmitting and receiving antenna systems 100E, 100F may comprise one or more arrays of antenna elements and may be controlled by a dedicated control unit 102E, 102F.

Each control unit 102E, 102F is capable of generating control signals for configuring the transmitting and receiving antenna systems 100E, 100F according to given antenna configurations.

Advantageously, the control units 102E, 102F are capable of mutually communicating through a communication channel 300.

Of course, the antenna system 100 may be arranged according to solutions different from those described above, according to the needs.

Figure 1:
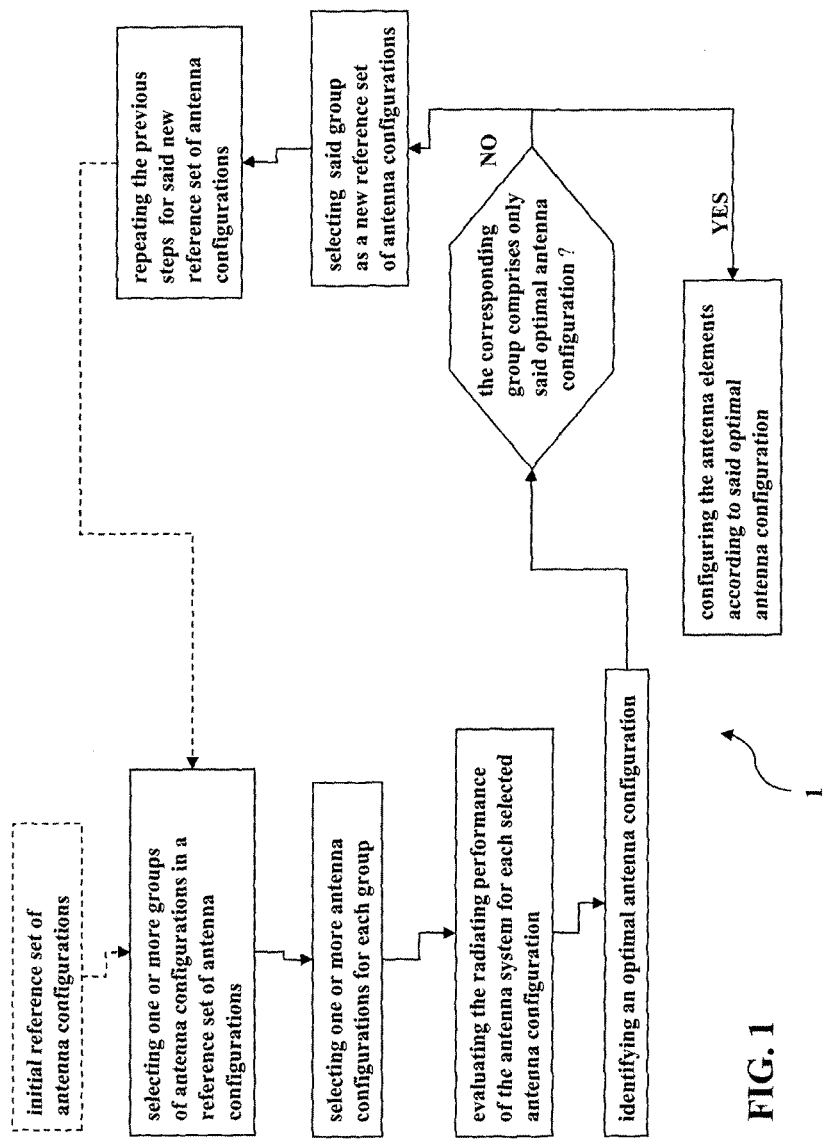
FIG. 1 is a flowchart representing an embodiment of a method for configuring a reconfigurable antenna system as disclosed herein.

Referring to FIG. 1, according to the present invention, the method 1 comprises a step a) of selecting one or more groups of antenna configurations in a reference set of antenna configurations.

Initially, said reference set of antenna configurations may be formed by the whole number of antenna configurations that are available for the antenna system 100.

If each antenna element 101 can radiate a single radiation pattern, the initial set of configuration may be an array having N antenna configurations, where N is the number of the antenna elements 101.

If each antenna element 101 can simultaneously radiate two radiation patterns, the initial set of configuration may be a matrix having $N^2$ antenna configurations, where N is the number of antenna elements 101.

More generally, if each antenna element 101 can simultaneously radiate M radiation patterns, the initial set of configuration may be a M-dimensional having $N^M$ antenna configurations. If the antenna system 100 is realized according to the embodiment shown in FIG. 3, the initial set of configurations may be formed by the set of antenna configurations available for the arrays 100A, 100B, 100C, or a portion thereof.

Figure 4:
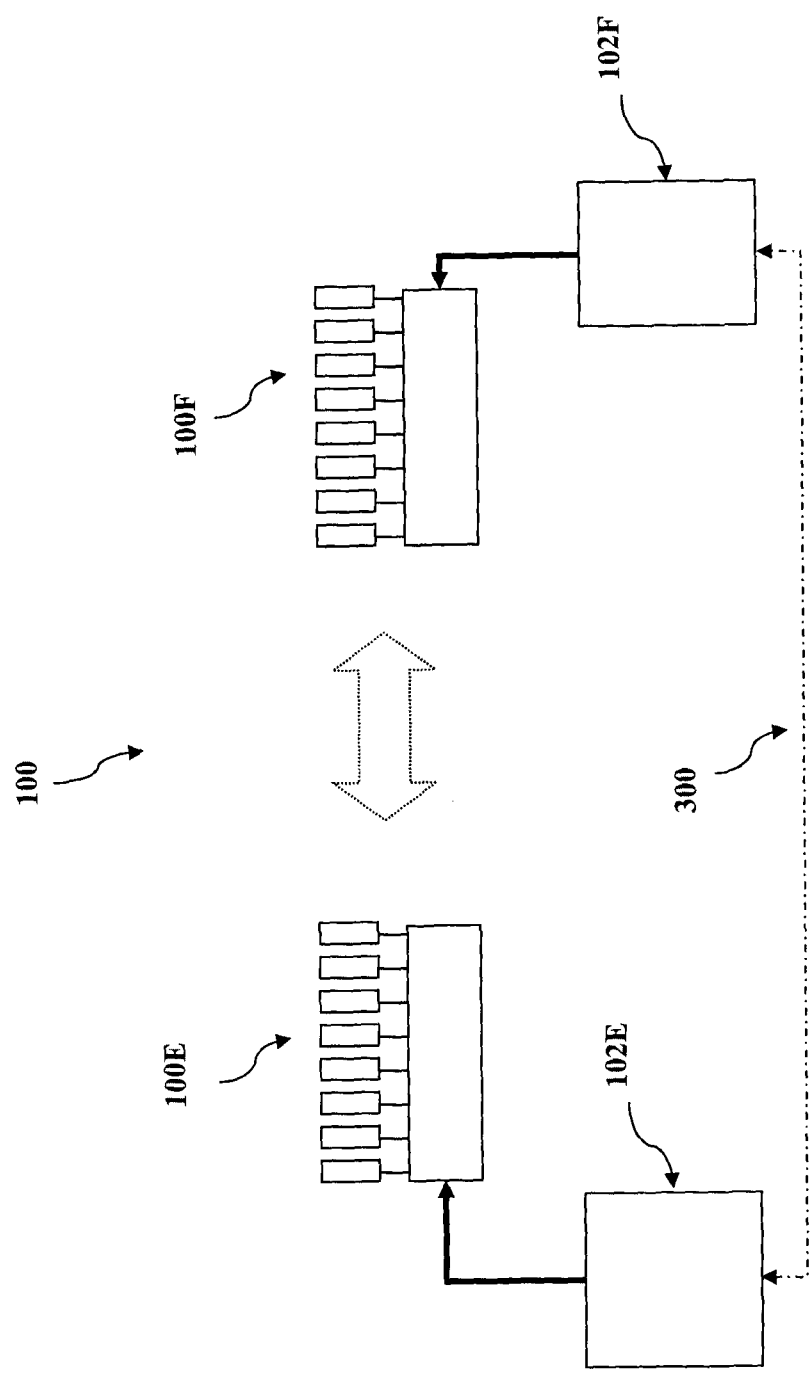
FIG. 4 is a block diagram representing another exemplary embodiment of the reconfigurable antenna system as disclosed herein.

Similarly, if the antenna system 100 is realized according to the embodiment shown in FIG. 4, the initial set of configurations may include the set of antenna configurations available for the transmitter and receiver antenna systems 100E, 100F, or a portion thereof.

The reference set of antenna configurations may be formed by a lower number of antenna configurations with respect to those available for the antenna system 100.

For example, the antenna system 100 may be comprised in a group of antenna systems communicating with one or more separate receivers or transmitters, as it might occur when multiple access points serve multiple clients (e.g. as in office environments, metropolitan areas, campuses, etc.).

In this case, the initial set of antenna configurations preferably comprises only the antenna configurations that ensure relatively low interference levels between the antenna system 100 and the other antenna systems.

Such antenna configurations may be selected according to different selection procedures.

As an example, they may be selected according to a selection procedure that provides for exhaustively checking the available antenna configurations for the antenna system 100 and select only the antenna configurations for which the interference level is below a given threshold.

Said selection procedure may be repeated at relatively long time intervals with respect to the average execution time of the method 1, since its basic aim is to set the initial boundary conditions for executing the method 1.

Preferably, in the mentioned step a), a plurality of groups of antenna configurations are selected. More preferably, only two groups of antenna configurations are selected.

The selected groups of antenna configurations may have a different number of antenna configurations.

It is evidenced that, in case each antenna configuration of the antenna elements 101 provides a given radiation lobe of the antenna system 100, each group of antenna configurations univocally identifies a given subspace of the whole radiating space that can be spanned by the antenna elements 101 (FIG. 5).

The method 1 comprises a step b) of selecting one or more antenna configurations to be tested in each group of antenna configurations.

Preferably, at the mentioned step b), a single antenna configuration to be tested is selected for each group of antenna configurations, which has been selected at the previous step a).

The criteria, according to which the antenna configurations to be tested are selected, may vary according to the needs.

For example, initially, they may be selected the antenna configurations that allow the antenna system 100 to provide radiation lobes positioned at the boundaries of the subspace that is identified by each group of antenna configurations.

At subsequent stages or cycles of the method 1, they may be selected the antenna configurations that provide a radiation lobe close to the one provided by an already tested antenna configuration, for which the antenna system 100 has provided a good radiating performance.

The method 1 comprises the step c) of evaluating the radiating performance of the antenna system 100 for each antenna configuration, which has been selected at the previous step b).

At the mentioned step c), the antenna elements are temporarily configured according to each of the antenna configurations, selected at the step b), and the radiating performance of the antenna system 100 is evaluated during one or more testing sessions.

Advantageously, the radiating performance of the antenna system 100 is evaluated on the base of given estimation values that are calculated during said testing sessions.

Within the framework of the present invention, the term "radiating performance" identifies the performance of the antenna system 100 while implementing the wireless communication channel, as a transmitter and/or receiver.

Preferably, the mentioned estimation values are indicative of the quality of the wireless communication channel that is implemented by the antenna system 100.

Said estimation values may comprise various parameters that are commonly used to check the quality of a wireless communication channel, such as the Received Signal Strength (RSS), the Error Vector Magnitude (EVM), the Signal-to-Noise ratio (SNR), the channel capacity, the channel throughput, the channel bit error rate, the packet error rate, and/or the rate index.

Preferably, at the mentioned step c), said estimation values may be obtained by making the antenna system 100 to communicate with one or more transmitter or receiver antenna systems that are operatively associated to the antenna system 100.

For example, predefined training sequences or pilot signals may be transmitted or received by the antenna system 100 during a testing session in order to check the wireless channel response.

Said training sequences may be exchanged during a dedicated interrogation session or, more generally, during any communication process between the antenna system 100 and the associated transmitter or receiver antenna systems.

Preferably, during a testing session, said step c) comprises the step of making the antenna system 100 to exchange a predefined number of data packets with the associated transmitter or receiver systems.

Preferably, said step c) comprises the step of calculating one or more preliminary estimation values for each of the exchanged data packets and the step of calculating said estimation values by averaging said preliminary estimation values over the predefined number of exchanged data packets.

Preferably, said data packets are exchanged at a fixed transmission rate to improve calculation accuracy of said estimation values.

Preferably, the predefined number of data packets exchanged during each testing session is greater than three.

Preferably, the exchanged data packets have a predefined structure, which is at least partially dedicated to provide information on the channel quality.

After the completion of the mentioned training sessions at the mentioned step c), the method 1 comprises the step d) of selecting the optimal antenna configuration, for which the antenna system 100 has provided the best radiating performance.

If the group of antenna configurations, to which the selected optimal antenna configuration belongs, comprises only said optimal antenna configuration, the method 1 has univocally provided a configuration antenna for configuring the antenna elements 101.

In this case, the method 1 comprises the step e) of configuring the antenna elements 101 according to the optimal antenna configuration, selected at said step d).

If the group of antenna configurations, to which the selected optimal antenna configuration belongs, comprises a plurality of antenna configurations, the method 1 has not yet converged on a solution.

The method 1 thus comprises the step f) of selecting the group of antenna configurations, which comprises the optimal antenna configuration that has been selected at the previous step d), as a new reference set of antenna configurations.

The method 1 then comprises the step g) of repeating the previous steps a)-d), e) or f) for said new reference set of antenna configurations.

In the method 1, the mentioned steps a)-d), e) or f) are therefore iteratively executed until an optimal antenna configuration is univocally selected.

At each execution cycle of the steps a)-d), e) or f) the reference set of configurations is reduced, so as to ensure the convergence on a solution.

Figure 6:
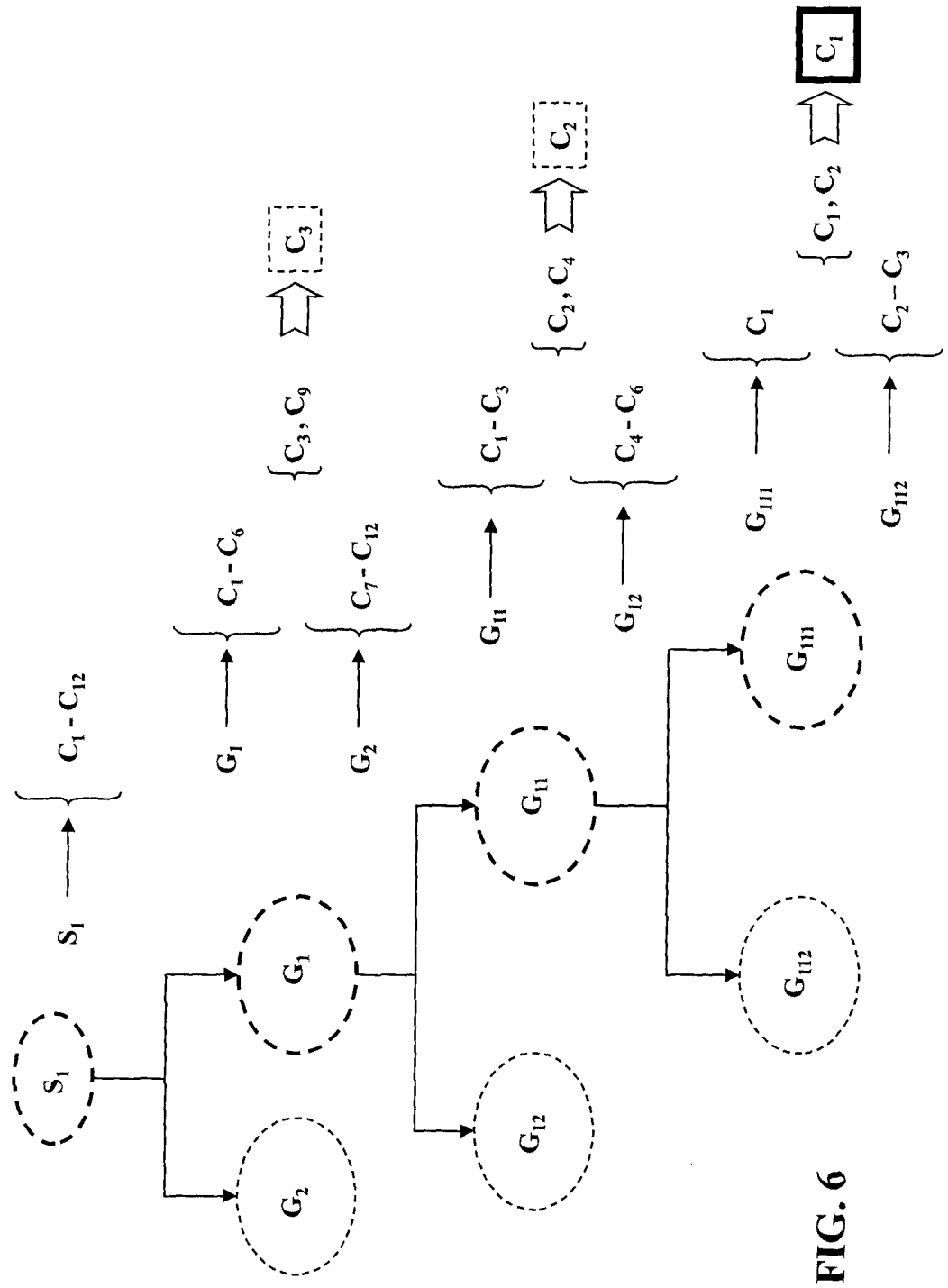
FIG. 6 is a diagram further representing the exemplary implementation of the method of FIG. 1.

Referring to FIGS. 5-6, an example of implementation of the method 1, according to the present invention, is described.

The described implementation example is not intended as limiting the scope of the present invention.

In such an implementation example, the antenna system 100 is supposed to be capable of radiating according to a set A of twelve different directions $A_1$-$A_{12}$. The antenna system 100A has thus an initial reference set of configurations $S_1$ that comprises 12 available antenna configurations $C_1$-$C_{12}$, each of said configurations corresponding to a different radiation direction $A_1$-$A_{12}$.

At the step a), the set of configurations $S_1$ is divided in two groups $G_1$, $G_2$ of antenna configurations.

Said groups are selected so that the group $G_1$ comprises the antenna configurations $C_1$-$C_6$ whereas the group $G_2$ comprises the antenna configurations $C_7$-$C_{12}$.

At the step b), the antenna configuration $C_3$ is selected from the group $G_1$ whereas the antenna configuration $C_9$ is selected from the group $G_2$.

At the step c), the radiating performance of the antenna system 100A is evaluated with the antenna elements $A_1$-$A_{12}$ configured according to the antenna configurations $C_3$, $C_9$, selected at the step b).

Supposing that $C_3$ is antenna configuration for which the antenna system 100A has shown the best radiating performance, $C_3$ is selected as the optimal antenna configuration at the step d).

The group $G_1$ of antenna configurations comprises a plurality of antenna configurations.

Since it has not converged to a solution, the method 1 provides for executing the step f), at which the group $G_1$ is selected as new reference set of antenna configurations.

The method 1 also provides for executing the step g) of repeating the steps a)-d), e) or f) for the new reference set $G_1$ of antenna configurations.

At the step a) of this subsequent execution cycle, the set of configurations $G_1$ is divided in two groups $G_{11}$, $G_{12}$ of antenna configurations.

Said groups are selected so that the group $G_{11}$ comprises the antenna configurations $C_1$-$C_3$ whereas the group $G_{12}$ comprises the antenna configurations $C_3$-$C_6$.

At the step b), the antenna configuration $C_2$ is selected from the group $G_{11}$ whereas the antenna configuration $C_4$ is selected from the group $G_{12}$.

At the step c), the radiating performance of the antenna system 100A is evaluated with the antenna elements $A_1$-$A_{12}$ configured according to the antenna configurations $C_2$, $C_4$, selected at the step b).

Supposing that $C_2$ is antenna configuration for which the antenna system 100A has shown the best radiating performance, $C_2$ is selected as the optimal antenna configuration at the step d).

The group $G_{11}$ of antenna configurations comprises a plurality of antenna configurations.

Again the method 1 has not converged to a solution.

The method 1 thus provides for executing the step f), at which the group $G_{11}$ is selected as new reference set of antenna configurations.

The method 1 then provides for executing the step g) of repeating the steps a)-d), e) or f) for the new reference set $G_{11}$ of antenna configurations.

At the step a) of this subsequent execution cycle, the set of configurations $G_{11}$ is divided in two groups $G_{111}$, $G_{112}$ of antenna configurations.

Said groups are selected so that the group $G_{111}$ comprises the sole antenna configuration $C_1$ whereas the group $G_{112}$ comprises the antenna configurations $C_2$-$C_3$.

At the step b), the antenna configuration $C_1$ is obviously selected from the group $G_{111}$ whereas the antenna configuration $C_2$ is selected from the group $G_{112}$.

At the step c), the radiating performance of the antenna system 100A is evaluated with the antenna elements $A_1$-$A_{12}$ configured according to the antenna configurations $C_1$, $C_2$, selected at the step b).

Supposing that $C_1$ is antenna configuration for which the antenna system 100A has shown the best radiating performance, $C_1$ is selected as the optimal antenna configuration at the step d).

The group $G_{111}$ of antenna configurations comprises the sole antenna configuration $C_1$.

Now, the method 1 has come to a unique solution and it therefore provides for executing the step e) of configuring the antenna elements $A_1$-$A_{12}$ according to the antenna configuration $C_1$.

The method, according to the present invention, provides remarkable advantages with respect to traditional methods for configuring reconfigurable antenna systems, in particular with respect to those that exhaustively estimate the wireless channel quality for all the available antenna configurations.

The method, according to the present invention, ensures a relatively short time for selecting an optimal antenna configuration for a given wireless communication channel, using widely available estimation parameters for checking the channel response, without the need of pre-computing any information.

The method, according to the present invention, allows effectively selecting an optimal antenna configuration for a given wireless communication channel with relatively low levels of power consumption, thereby reducing possible detrimental effects on the performance of the reconfigurable antenna system.

The method, according to the present invention, can be easily implemented in practice by a digital processing device, at relatively low industrial costs.

The invention claimed is:

1. A method for configuring a reconfigurable antenna system, said antenna system comprising a plurality of antenna elements that can configured according to a plurality of different antenna configurations, the method comprising:
    (a) selecting one or more groups of antenna configurations in a reference set of antenna configurations;
    (b) selecting one or more antenna configurations to be tested for each group of antenna configurations, which has been selected at the previous step (a) of selecting one or more groups of antenna configurations;
    (c) evaluating the radiating performance of said reconfigurable antenna system for each antenna configuration, which has been selected at the previous step (b) selecting one or more groups of antenna configurations to be tested, the radiating performance of said reconfigurable antenna system being evaluated on the base of estimation values that are calculated during one or more testing sessions of said reconfigurable antenna system, wherein evaluating the radiating performance comprises
        making the antenna system exchange a predefined number of data packets with one or more transmitter or receiver systems that are operatively associated with said antenna system,
        calculating preliminary estimation values for each of the exchanged data packets, and
        calculating said estimation values by averaging said preliminary estimation values over said predefined number of data packets;
    (d) selecting the optimal antenna configuration, for which said reconfigurable antenna system has provided the best radiating performance during said testing sessions;
    (e) if the group of antenna configurations, to which said optimal antenna configuration belongs, comprises only said optimal antenna configuration, configuring said antenna elements according to said optimal antenna configuration;
    (f) if the group of antenna configurations, to which said optimal antenna configuration belongs, comprises a plurality of antenna configurations, selecting said group of antenna configuration as new reference set of antenna configurations; and
    (g) repeating one or more of the previous steps (a, b, c, d, e, f) for said new reference set of antenna configurations.

2. The method, according to claim 1, characterised in that, at said step (a) of selecting one or more groups of antenna configurations, two groups of antenna configurations are selected.

3. The method, according to claim 1, characterised in that each of said antenna configurations corresponds to a different radiation direction for said antenna system.

4. The method, according to claim 1, characterised in that, at said step (b) of selecting one or more groups of antenna configurations to be tested, a sole antenna configuration to be tested is selected.

5. The method, according to claim 1, characterised in that said predefined number of data packets is greater than three.

6. The method, according to claim 1, characterised in that said estimation values are indicative of the quality of the wireless communication channel implemented by said reconfigurable antenna system.

7. The method, according to claim 6, characterised in that said estimation values comprise Received Signal Strength, Error Vector Magnitude, Signal-to-Noise ratio, channel capacity, channel throughput, channel bit error rate, packet error rate and/or rate index.

8. A reconfigurable antenna system comprising:
   a plurality of antenna elements that are each configurable according to any one of a plurality of different antenna configurations;
   a control unit; and
   a memory having software stored thereon and configured upon execution by said control unit for implementing operations comprising:
   (a) selecting one or more groups of antenna configurations in a reference set of antenna configurations;
   (b) selecting one or more antenna configurations to be tested for each of the selected one or more groups of antenna configurations;
   (c) evaluating the radiating performance of said reconfigurable antenna system for each of the selected one or more groups of antenna configurations to be tested, the radiating performance of said reconfigurable antenna system being evaluated on the base of estimation values that are calculated during one or more testing sessions of said reconfigurable antenna system, wherein evaluating the radiating performance comprises
   making the antenna system exchange a predefined number of data packets with one or more transmitter or receiver systems that are operatively associated with said antenna system,
   calculating preliminary estimation values for each of the exchanged data packets, and
   calculating said estimation values by averaging said preliminary estimation values over said predefined number of data packets;
   (d) selecting the optimal antenna configuration, for which said reconfigurable antenna system has provided the best radiating performance during said testing sessions;
   (e) if the group of antenna configurations, to which said optimal antenna configuration belongs, comprises only said optimal antenna configuration, configuring said antenna elements according to said optimal antenna configuration;
   (f) if the group of antenna configurations, to which said optimal antenna configuration belongs, comprises a plurality of antenna configurations, selecting said group of antenna configuration as new reference set of antenna configurations; and
   (g) repeating one or more of the previous operations (a, b, c, d, e, f) for said new reference set of antenna configurations.

9. The system according to claim 8, wherein selecting one or more groups of antenna configurations in a reference set of antenna configurations comprises selecting two groups of antenna configurations.

10. The system according to claim 8, wherein each of said antenna configurations corresponds to a different radiation direction for said antenna system.

11. The system according to claim 8, wherein selecting one or more antenna configurations to be tested comprises selecting a sole antenna configuration to be tested.

12. The system according to claim 8, wherein the predefined number of data packets are exchanged at a fixed rate with said transmitter or receiver systems.

13. The system according to claim 8, wherein said predefined number of data packets is greater than three.

14. The system according to claim 8, wherein said estimation values are indicative of the quality of the wireless communication channel implemented by said reconfigurable antenna system.

15. The system according to claim 14, wherein said estimation values comprise Received Signal Strength, Error Vector Magnitude, Signal-to-Noise ratio, channel capacity, channel throughput, channel bit error rate, packet error rate and/or rate index.

* * * * *